(12) United States Patent
Nagata et al.

(10) Patent No.: US 9,811,291 B2
(45) Date of Patent: Nov. 7, 2017

(54) PRINTING SYSTEM AND PRINT DATA REWRITING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Katsuaki Nagata, Mishima (JP); Hideyuki Kato, Yokohama (JP); Satoshi Oyama, Mishima (JP)

(73) Assignees: KABUSHIKIK KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 117 days.

(21) Appl. No.: 14/327,694

(22) Filed: Jul. 10, 2014

(65) Prior Publication Data

US 2016/0011826 A1    Jan. 14, 2016

(51) Int. Cl.
| | |
|---|---|
| *G06F 3/12* | (2006.01) |
| *B65H 7/20* | (2006.01) |
| *G06K 15/00* | (2006.01) |
| *G06K 15/16* | (2006.01) |

(52) U.S. Cl.
CPC ............ *G06F 3/1213* (2013.01); *B65H 7/20* (2013.01); *G06F 3/1264* (2013.01); *G06F 3/1285* (2013.01); *G06K 15/16* (2013.01); *G06K 15/403* (2013.01)

(58) Field of Classification Search
CPC ..... G06K 15/16; G06K 15/403; G06F 3/1211
See application file for complete search history.

(56) References Cited

U.S. PATENT DOCUMENTS

| | | | |
|---|---|---|---|
| 2003/0053812 A1 | 3/2003 | Nakayama | |
| 2008/0177419 A1* | 7/2008 | Doyle | ............................ 700/221 |
| 2010/0252986 A1* | 10/2010 | Nakajima | ..................... 271/3.14 |
| 2010/0254741 A1* | 10/2010 | Saitsu | ................ G03G 15/6505 399/405 |
| 2012/0001387 A1* | 1/2012 | Mutsuno | ................ B65H 31/24 271/298 |
| 2012/0189340 A1* | 7/2012 | Hagiwara | ................... B41J 2/32 399/82 |
| 2013/0188206 A1* | 7/2013 | Nakata et al. | ................. 358/1.9 |
| 2014/0078548 A1* | 3/2014 | Kikuchi | ................ G06F 3/1203 358/1.15 |

* cited by examiner

*Primary Examiner* — Nicholas Pachol
(74) *Attorney, Agent, or Firm* — Amin, Turocy & Watson LLP; Gregory Turocy

(57) ABSTRACT

In accordance with one embodiment, a printing system comprises a memory, a processor and an interface. The processor rewrites the first information contained in the print data stored in the memory and designating a sheet stacking section at an end of a conveyance path of an image forming apparatus. The interface sends the rewritten print data to the image forming apparatus.

5 Claims, 7 Drawing Sheets

PRINTING SYSTEM AND PRINT DATA REWRITING METHOD

FIELD

Embodiments described herein relate to a technology of selecting a cassette or tray at an end of a sheet conveyance path of an image forming apparatus.

BACKGROUND

There is known an image forming apparatus provided with a plurality of sheet feed cassettes and an image forming apparatus provided with a plurality of trays serving as discharging destinations. Such an image forming apparatus controls the feed of sheet from an optional cassette or the discharging of sheet to an optional tray according to the set information contained in print data. The user can designate a cassette to serve as a feed source or a tray to serve as a discharging destination, and if no designation is made by the user, defaulted values are programmed into print data.

Sometimes it takes the user some time to get a printing object depending on a cassette serving as a feed source or a tray serving as a discharging destination.

DETAILED DESCRIPTION

In accordance with one embodiment, a printing system comprises a memory, a processor and an interface. The processor rewrites the first information contained in the print data stored in the memory and designating a sheet stacking section at an end of a conveyance path of an image forming apparatus. The interface sends the rewritten print data to the image forming apparatus.

In accordance with embodiments described herein, a technology is provided according to which the set information designating a cassette to serve as a sheet feed source and a tray to serve as a sheet discharging destination during a printing process is rewritten to produce a print early. That is, if there are a plurality of trays serving as sheet discharging destinations or a plurality of cassettes serving as sheet feed sources in an image forming apparatus, set information is rewritten so that the sheet conveyance path inside the image forming apparatus is shortest to provide the user with a print early.

Embodiments of the present invention are described below with reference to accompanying drawings.

Figure 1:
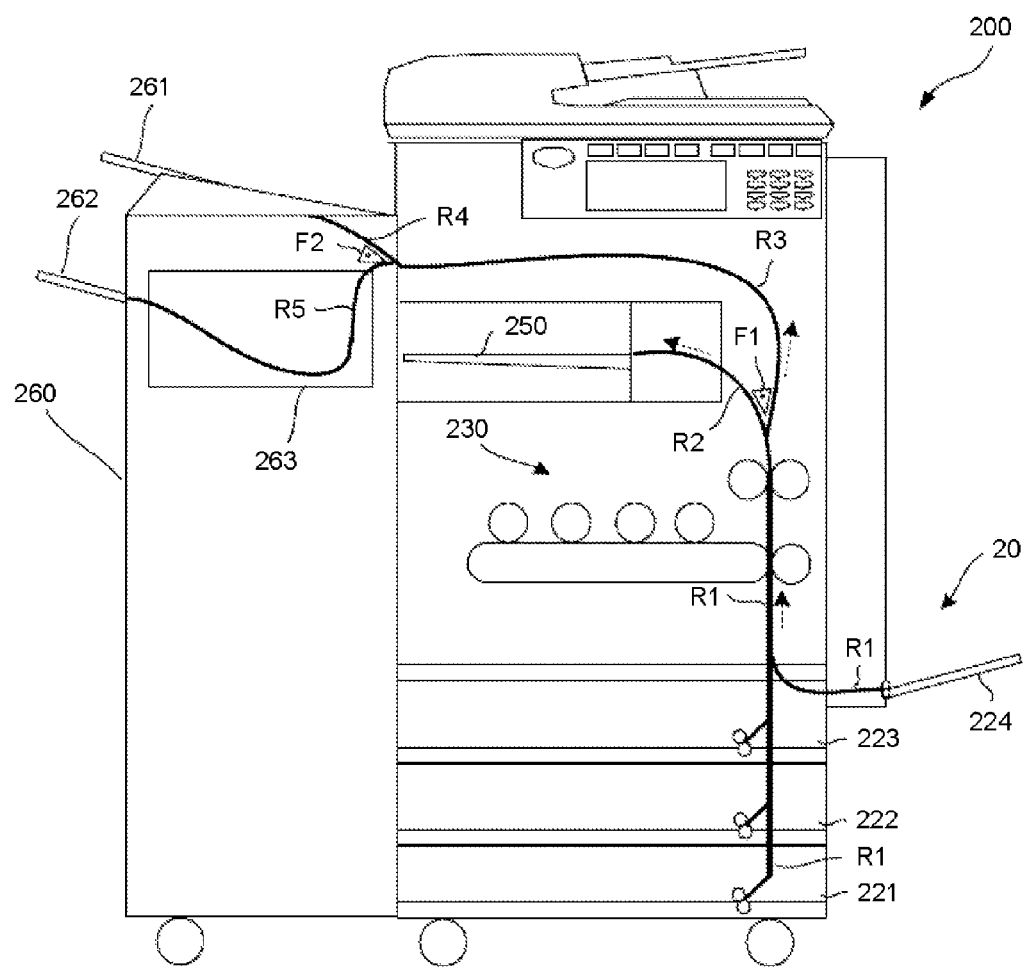
FIG. 1 is a diagram illustrating an example of the hardware configuration of an image forming apparatus according to an embodiment.

FIG. 1 is a diagram illustrating an example of the hardware configuration of an image forming apparatus according to an embodiment and a perspective view of a part of the internal units of the image forming apparatus. Further, as shown in FIG. 1, a sheet conveyance direction is represented by a dotted arrow. The image forming apparatus 200 comprises feed cassettes 221, 222 and 223, a feed tray 224, an image forming section 230, an in-body tray 250, a finisher 260, conveyance paths R1, R2 and R3 and a flapper F1. The finisher 260 comprises a post-processing section 263, finisher trays 261 and 262, conveyance paths R4 and R5 and a flapper F2. Further, the feed cassettes 221, 222 and 223 and the feed tray 224 can be collectively referred to as a feed section 20, if needed.

The conveyance path R1 conveys the sheet fed from the feed cassettes 221-223 at an end of the conveyance paths or from the feed tray 224 to the image forming section 230. The image forming section 230 forms an image on one side of the conveyed sheet. The sheet on which an image is formed is guided into either of the conveyance paths R2 and R3 under the guidance of the flapper F1.

The conveyance path R2 conveys the sheet to the in-body tray 250 at an end of the conveyance path R2, thereby discharging the sheet advancing on the conveyance path R2 to the internal tray 250. Further, the in-body tray 250 is opened on the nearer side of the sheet surface shown in FIG. 1 so that the user can take away the stacked printed sheet from the opening section.

On the other hand, the conveyance path R3 conveys sheet to the finisher 260. The sheet conveyed to the finisher 260 is guided into either of the conveyance paths R4 and R5 under the guidance of the flapper F2. The sheet advancing on the conveyance path R4 is discharged to the finisher tray 261. On the other hand, the sheet advancing on the conveyance path R5 is conveyed to the post-processing section 263 which carries out bundling processing and an optional one of a stapling processing, a hole punching processing and a folding processing (refer to as booklet) or the combination thereof on one or more conveyed sheets. The post-processed sheet is discharged to the finisher tray 262 through the conveyance path R5. The processor 210 and the conveyance path controller 240 which will be described later control the conveyance paths R1-R5 and operations of the flappers F1 and F2.

The sheet fed from the feed section 20 is finally discharged to any of the in-body tray 250 and the finisher trays 261 and 262, as stated above. As shown in FIG. 1, the distance from the feed section 20 to the in-body tray 250 is a distance obtained by adding up the lengths of the conveyance paths R1 and R2. Further, the distance from the feed section 20 to the finisher tray 261 is a distance obtained by adding up the lengths of the conveyance paths R1, R3 and R4, and the distance from the feed section 20 to the finisher tray 262 is a distance obtained by adding up the lengths of the conveyance paths R1, R3 and R5. As shown in FIG. 1, among the conveyance distances from the feed section 20 to each tray, the distance from the feed section 20 to the in-body tray 250 is shortest, sequentially followed by the distance from the feed section 20 to the finisher tray 261 and the distance from the feed section 20 to the finisher tray 262. Further, the post-processing section 263 and the finisher tray 262 can be vertically moved through a carriage, and the lower the post-processing section 263 and the finisher tray 262 are, the longer the conveyance path R5 is (the extended part is not shown in FIG. 1), and correspondingly the longer the conveyance distance from the feed section 20 is.

As shown in FIG. 1, the conveyance distance to the discharging destination is shortened if sheet is fed from the top feed cassette 223 and lengthened if sheet is fed from the bottom feed cassette 221. Sheet, if stacked in the feed tray 224, is fed from the feed tray 224 so that the conveyance distance is at least shortened with respect to that in a case where sheet is fed from the feed cassette 221.

(Embodiment 1)

Figure 2:
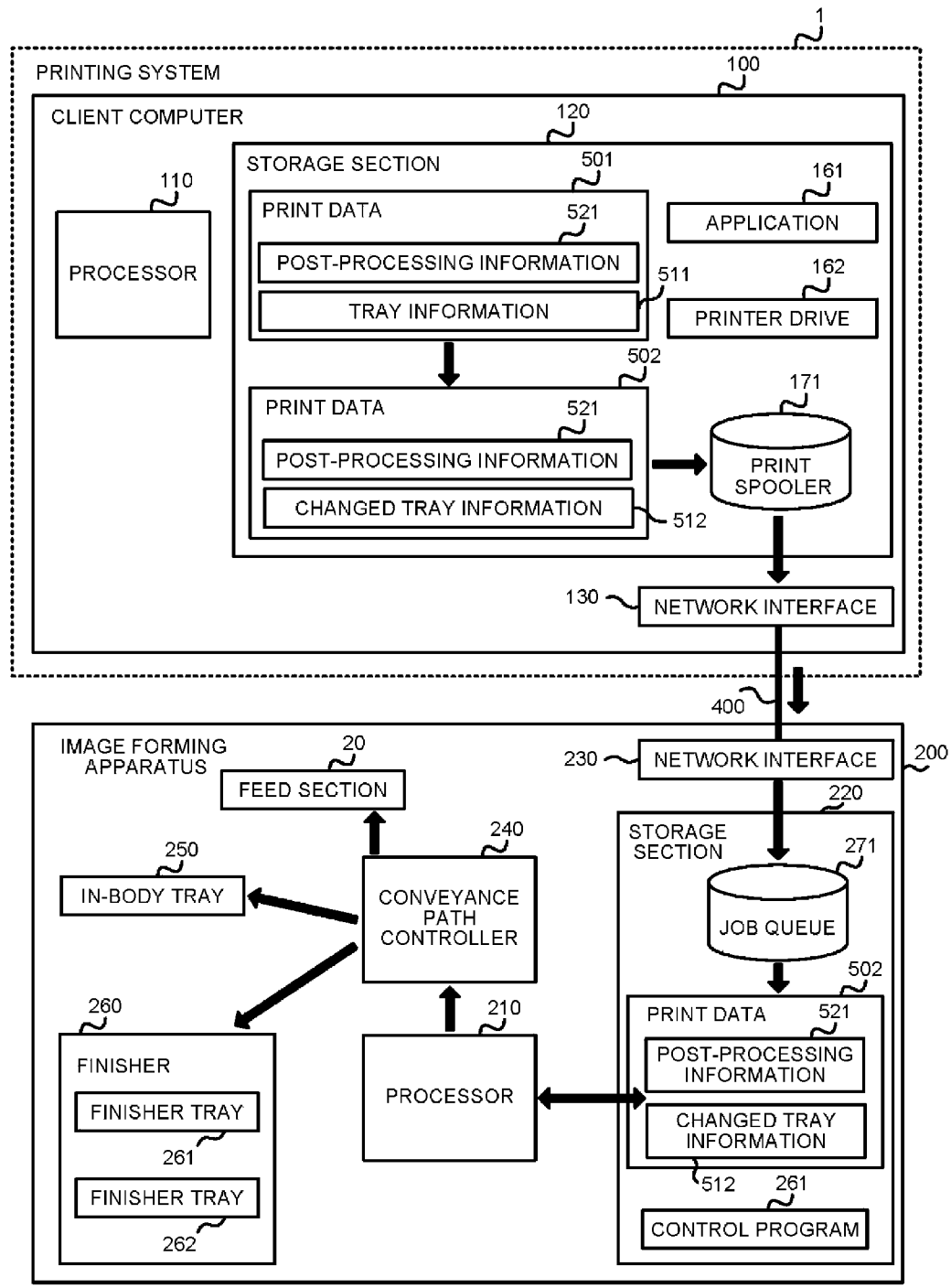
FIG. 2 is a diagram illustrating an example of the configuration according to embodiment 1 and a data printing operation.

FIG. 2 illustrates the configuration of a printing system according to embodiment 1. The printing system 1 is a client computer 100 having a function of rewriting the information determining a feed cassette or discharging tray of an image forming apparatus 200. The client computer 100 is connected with an image forming apparatus 200 via a network 400.

Identical to the conventional computer in hardware configuration, the client computer 100 comprises a processor 110, a storage section 120 and a network interface 130. Apart from the processor 110, the storage section 120 and the network interface 130, the client computer 100 may further comprise an output device such as a monitor and an input device such as a keyboard or mouse. The processor 110 which is an arithmetic processing device such as a CPU (Central Processing Unit) functions by cooperating with various kinds of hardware according to the code instruction of the software stored in the storage section 120. The storage section 120 consists of a volatile primary storage device, a nonvolatile auxiliary storage device or a ROM (Read Only Memory).

In the present embodiment, the storage section 120 stores an application 161 and a printer drive 162 in advance. The application 161, which is a piece of document editing software in the present embodiment, may also be a piece of table calculation software or image processing software. The printer drive program 162 which is a piece of drive software used during a printing process converts the data of a print object into print data of a given format and synchronously makes a setting on sheet size or magnification/reduction rate and Nin1 and outputs print data containing the setting information to a print spooler 171. Further, the printer drive 162 contains codes for rewriting the setting information contained in the print data.

The network interface 130 which is, for example, a LAN (Local Area Network) card outputs print data to the image forming apparatus 200 according to an instruction from the processor 110.

In addition to the components shown in FIG. 1, the image forming apparatus 200 further comprises a processor 210, a storage section 220, a network interface 230 and a conveyance path controller 240. The processor 210 which is an arithmetic processing device uniformly controls each piece of hardware according to the code instruction of the control program 261 stored in the storage section 220. The storage section 220 comprises a volatile primary storage device and a nonvolatile auxiliary storage device or a ROM. The network interface 230 is, for example, a LAN card. The conveyance path controller 240 directly controls the conveyance paths R1-R5 and the flappers F1 and F2 (shown in FIG. 1) according to an instruction from the processor 210. It is assumed in the present embodiment that the conveyance path controller 240 is installed by an ASIC (Application Specific Integrated Circuit).

The processing ended with the printout of a document generated by the client computer 100 is described below with reference to FIG. 2. Further, the selection of and the control over a sheet discharging destination is mainly described below.

The processor 110 serving as the control section of the client computer 100 generates document data according to the code instruction of the application 161 stored in the storage section (memory) 120. If the printout operation of a user is received, the processor 110 temporarily converts the document data into print data 501 according to the code instruction of the printer drive 162. The print data 501 contains post-processing information 521 and tray information 511. The post-processing information 521 is information designating the processing to be carried out for printed sheet. In the present embodiment, the post-processing information 521 is capable of designating whether or not to carry out a hole punching processing, a stapling processing or a booklet processing.

The tray information 511 contains information designating the feed of sheet from which sheet stacking section in the feed section 20 and information designating the discharging of printed sheet to which one of the finisher trays 261 and 262 and the in-body tray 250. If one of the hole punching processing, the stapling processing and the booklet processing is designated in the post-processing information 521, the processor 110 sets the finisher tray 262 as a discharging destination in the tray information 511. When the finisher 260 is affiliated to the main body of the image forming apparatus 200, the processor 110 also sets the finisher tray 261 in the tray information 511 as a defaulted value even if no post-processing is carried out.

In the conventional technology, the print data 501 is output to the print spooler 171 without being changed and then output to the image forming apparatus 200. In this way, the printed sheet is output to a defaulted finisher tray 261 if no post-processing is designated.

Thus, sheet is discharged to the finisher tray 261 which is selected as a discharging tray by default when the user is unconscious of setting an output destination. If sheet is discharged to the finisher tray 261, an independent unit such as the finisher 260 becomes a discharging destination, thus the initial operation of the finisher 260 is needed during a printing process. Due to the initial operation, a long time is taken until the user gets a print. Moreover, the conveyance path is extended when sheet is discharged to the finisher tray 261, thus, more time is taken when compared with that taken to discharge sheet to the in-body tray 250.

Thus, in embodiment 1, if no processing job such as stapling is set by the user, the processor 110 rewrites the tray information 511 serving as the first information and output the rewritten tray information to the print spooler 171 so that sheet is discharged to the in-body tray 250 to shorten the conveyance path of the sheet. Thus, the user can get a print early. In this example, the rewritten tray information is referred to as changed tray information 512, and the rewritten data is referred to as print data 502. The rewriting operation will be described later.

The processor 110 temporarily stores the print data in the print spooler 171 and sends the print data to the image forming apparatus 200 sequentially via the network interface 130 and the network 400. Identically, the processor 110 temporarily stores the print data 502 in the print spooler 171 and sends the print data 502 to the image forming apparatus 200 if a set output timing is reached.

The network interface 230 of the image forming apparatus 200 receives the print data 502. The processor 210 registers the print data 502 received from the rear end of the job queue 271 of the storage section 220 according to the code instruction of the control program 261.

The processor 210 controls, using the image forming section 230, the successive printing of the print data registered in the job queue 271. The processor 210 reads the tray information in the print data and outputs the data indicated by the tray information to the conveyance path controller 240. The conveyance path controller 240 controls the conveyance paths R1-R5 and the flappers F1 and F2 so that the printed sheet is discharged to an optional one of the in-body tray 250 and the finisher trays 261 and 262 according to the input data. In the case of the print data 502, the in-body tray 250 is designated in the changed tray information 512, as stated above, thus, the conveyance path controller 240 conducts a control to discharge the printed sheet to the in-body tray 250. The operations carried out in the image forming apparatus 200 may be the conventional technology.

Figure 3:
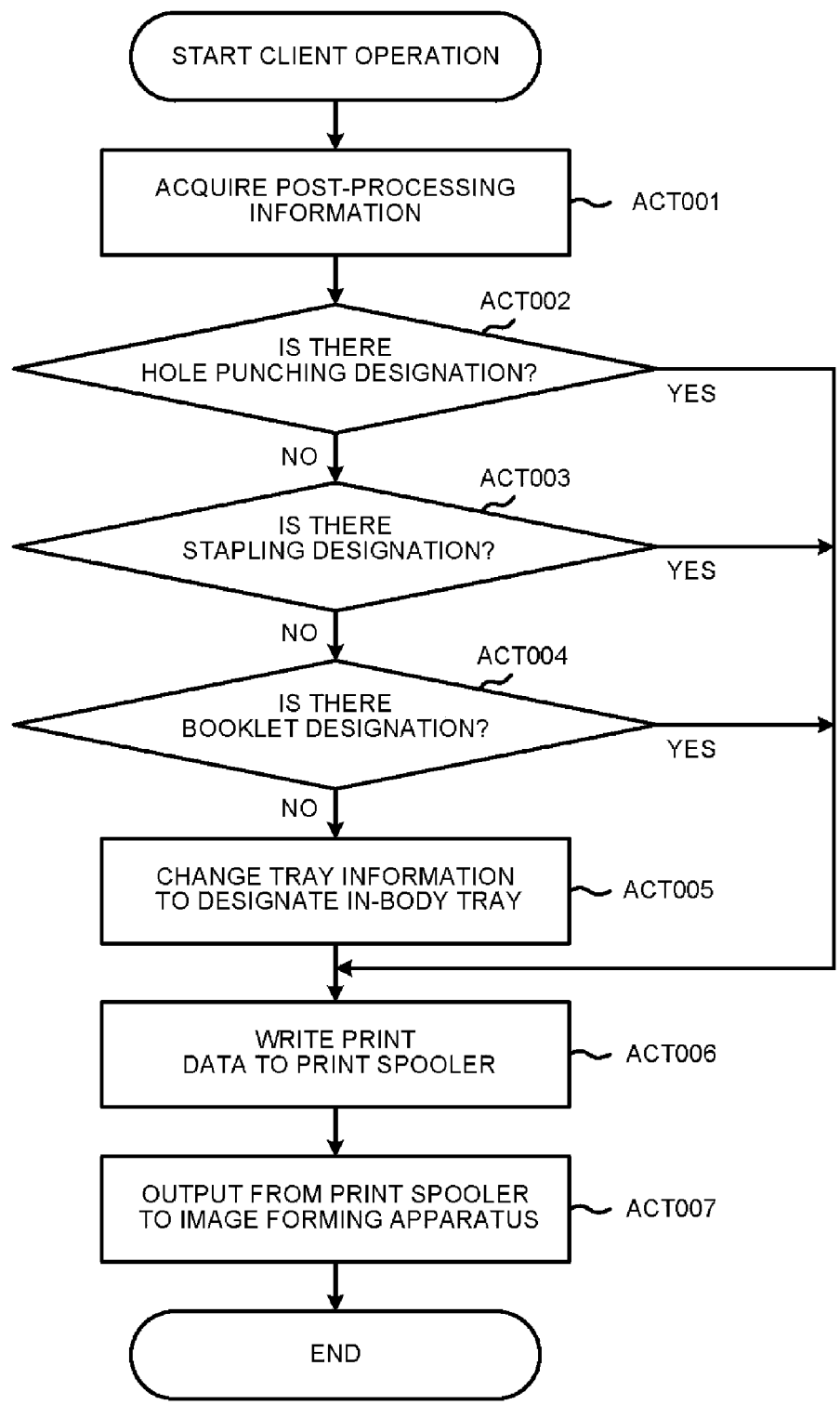
FIG. 3 is a flowchart illustrating an example of the operations carried out by a client computer according to embodiment 1.

The operation of rewriting the tray information in the client computer 100 is described below with reference to the flowchart shown in FIG. 3. The flow of the flowchart is realized by the processor 110 by loading the printer drive 162 pre-stored in the storage section 120 and executing an operation according to the code instruction of the printer drive 162.

The processor 110 extracts the post-processing information in the print data (ACT 001). The processor 110 determines which one of a hole punching processing (ACT 002), a stapling processing (ACT 003) or a booklet processing (ACT 004) is designated in the post-processing information. ACT 006 is executed if anyone of the processing above is designated. On the other hand, if none of the processing above is designated, the processor 110 rewrites the tray information serving as the first information in the print data so as to designate the in-body tray 250 (ACT 005), and then the flow proceeds to ACT 006. In this way, the rewriting of ACT 005 is skipped if any of the processing above is designated in the post-processing information. That is, the printed sheet is discharged to the finisher 262 if a post-processing is designated.

The processor 110 outputs the print data (rewritten print data if the print data is rewritten) to the print spooler 171 (ACT 006) and sequentially sends the print data in the print spooler 171 to the image forming apparatus 200 (ACT 007).

Figure 4:
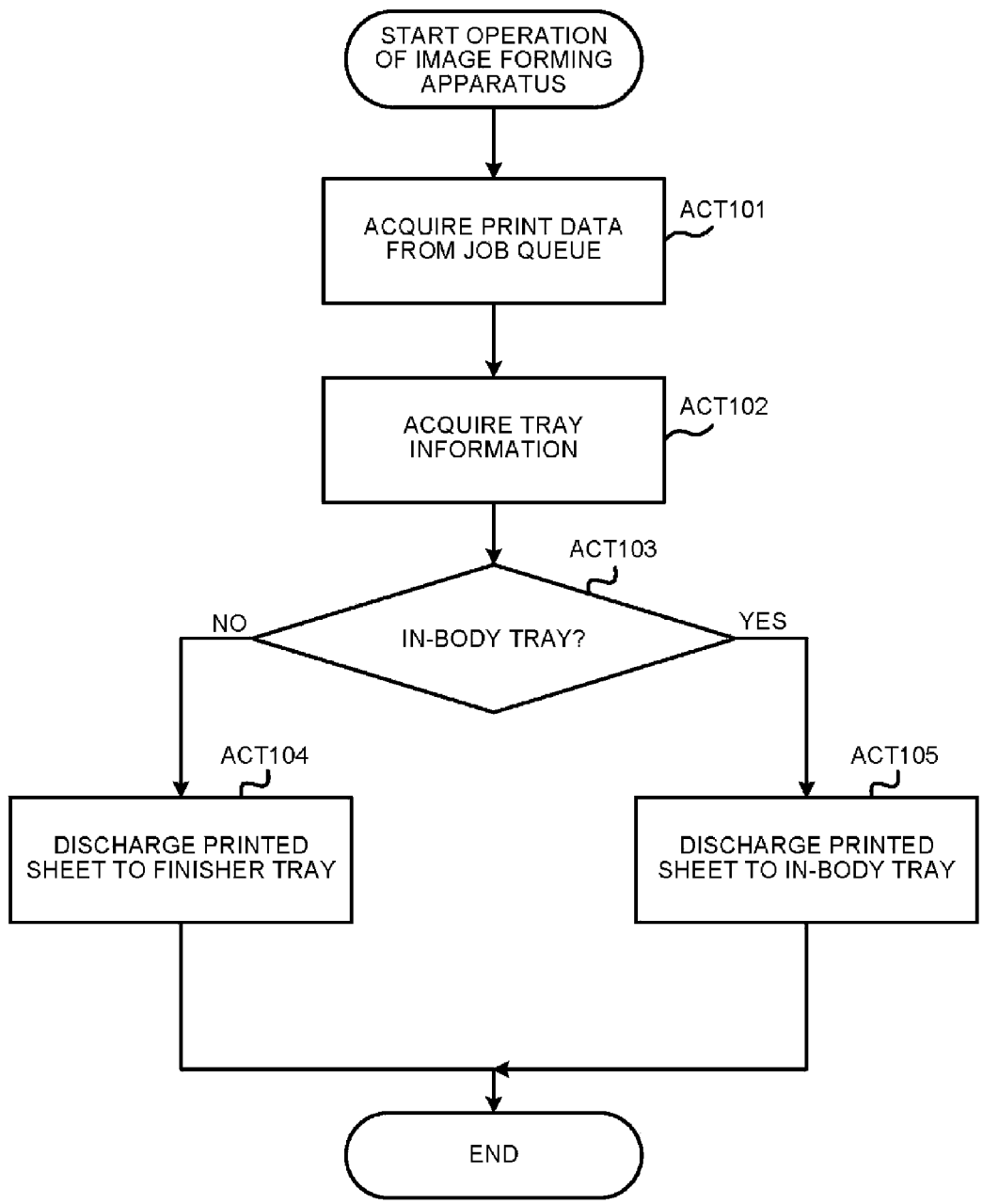
FIG. 4 is a flowchart illustrating an example of the operations of an image forming apparatus.

The printed sheet discharging control of the image forming apparatus 200 is described with reference to the flowchart shown in FIG. 4. The processor 210 acquires the print data registered in the job queue 271 according to the code instruction of the control program 261 (ACT 101). The processor 210 extracts the tray information in the acquired print data (ACT 102). The processor 210 controls the conveyance path controller 240 according to the tray information. That is, when a finisher tray is designated (NO in ACT 103), the processor 210 outputs an instruction signal to the conveyance path controller 240 to print and output the sheet to the finisher trays 261 and 262. In this way, the printed sheet is discharged to either of the finisher trays 261 and 262 under the control of the conveyance path controller 240 (ACT 104).

On the other hand, if the in-body tray is designated in the tray information (YES in ACT 103:), the processor 210 outputs instruction data to the conveyance path controller 240 to print and output the sheet to the in-body tray 250. In this way, the printed sheet is discharged to the in-body tray 250 under the control of the conveyance path controller 240 (ACT 105).

In the example above, the aforementioned operations of selecting a tray serving as a discharging destination is also applicable to selecting one of the feed cassettes 221, 222 and 223 and the feed tray 224 as a feed source. The following determination operation of selecting one of the feed cassettes 221, 222 and 223 and the feed tray 224 as a feed source by the processor 11 is described below with reference to the flowchart shown in FIG. 3 as a processing following ACT 005 or a processing carried out after the result of ACT 002-ACT 004 is 'Yes'. That is, the processor 110 acquires the designated sheet size contained in the print data and specifies the cassette or tray in which the sheets of the designated size are stacked in the feed section 20. If only one of the cassette or tray is specified in the feed section 20, the print data in the print spooler is not changed (ACT 006). If more than one of the cassettes or trays is specified in the feed section 20, the processor 110 rewrites the tray information so that the top one of the cassettes or trays is designated. Then, the print data is written into the print spooler (ACT 006). In this way, the conveyance distance is shortened even in the case of sheet feed sources so that the user can get a print early.

(Embodiment 2)

The configuration of a client computer and an image forming apparatus and an exemplary output of print data from the client computer to the image forming apparatus are described in embodiment 1. The print data created by the client computer may also be centrally managed by a print server. In this case, the print data may be rewritten by the print server. This case is described in embodiment 2.

Figure 5:
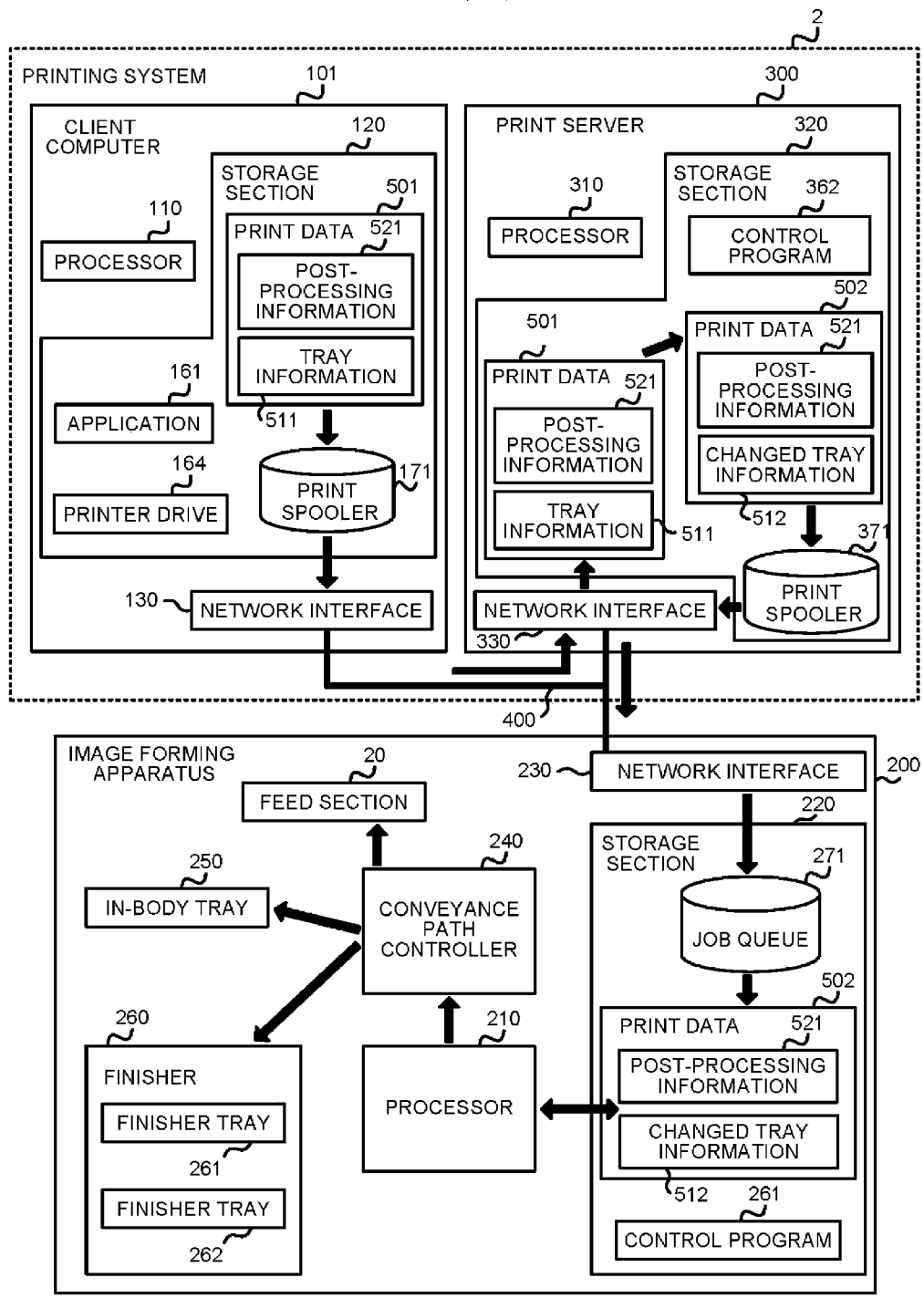
FIG. 5 is a diagram illustrating an example of the configuration of a printing system according to embodiment 2 and illustrating a data printing operation.

FIG. 5 is a diagram illustrating an example of the configuration of a printing system 2 consisting of a client computer 101 and a print server 300 according to embodiment 2. The client computer 101, the print server 300 and an image forming apparatus 200 send or receive data via a network 400.

The client computer 101, which has the same hardware configuration with the client computer 100 described in embodiment 1, stores a printer drive 164 instead of the printer drive 162 described in embodiment 1. The printer drive 164 is the conventional code for outputting print data 501 to a print spooler 171 while keeping the print data 501 in the original installed state.

Identical to the conventional computer in hardware configuration, the print server 300 comprises a processor 310, a storage section 320 and a network interface 330. The operations of each device are the same as those of the client computer 100 described in embodiment 1. A control program 362 is stored in the storage section 320 in advance. The control program 362 is a program in which codes for rewriting tray information are compiled in addition to the conventional codes related to print data.

The image forming apparatus 200 is the same as that described in embodiment 1 and is therefore not described here repeatedly.

The processor 110 of the client computer 101 generates print data 501 according to the code instruction of the printer drive 164 and outputs the print data 501 to a print spooler 171 without changing the print data 501. The processor 110 sends the print data 501 in the print spooler 171 to the print server 300 by controlling the network interface 130.

If the network interface 330 of the print server 300 receives the print data 501, then the processor 310 rewrites tray information 511 according to the code instruction of the control 362. The processor 310 outputs the rewritten print data 502 to the print spooler 371. The processor 310 sends the print data in the print spooler 371 to the image forming apparatus 200 via the network interface 330. The operations carried out by the image forming apparatus 200 receiving the print data 502 are the same as those described in embodiment 1.

Figure 6:
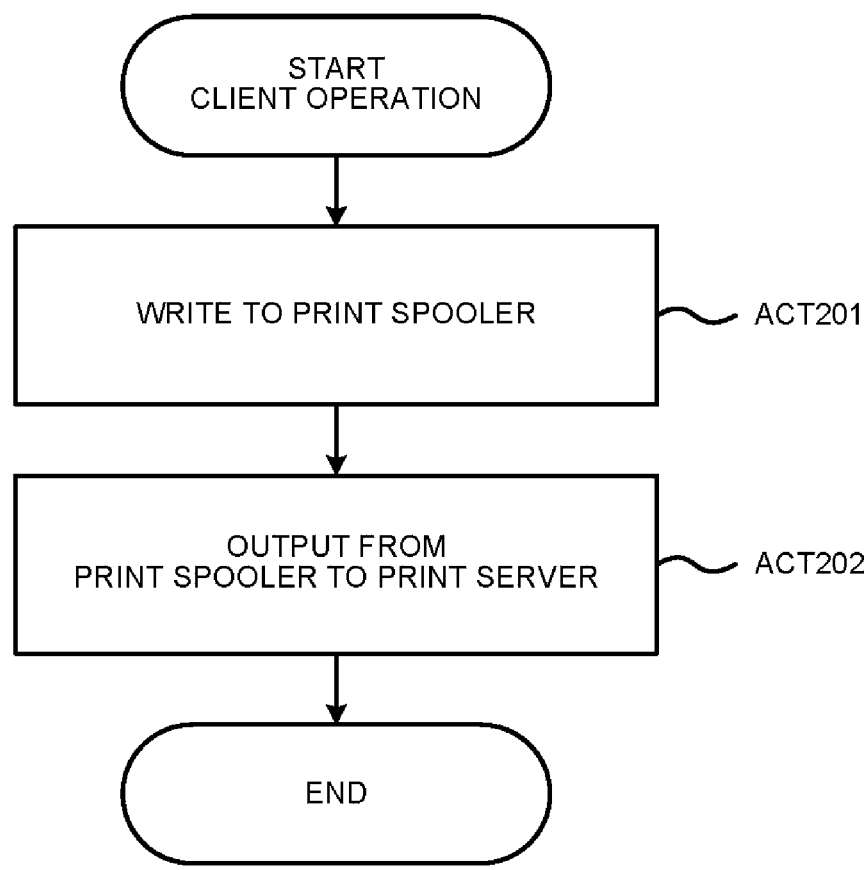
FIG. 6 is a flowchart illustrating an example of the operations carried out by a client computer according to embodiment 2.

Next, the operations of the client computer 101 are exemplified in the flowchart of FIG. 6. The operations shown in FIG. 6 are carried out by the processor 110 by executing an operation according to the code instruction of the printer drive 164. The processor 110 converts the document data created using an application 161 into print data and outputs the print data to the print spooler 171 without changing the print data (ACT 201). The processor 110 sends the print data registered in the print spooler 171 to the print server 300 at any time (ACT 202).

Figure 7:
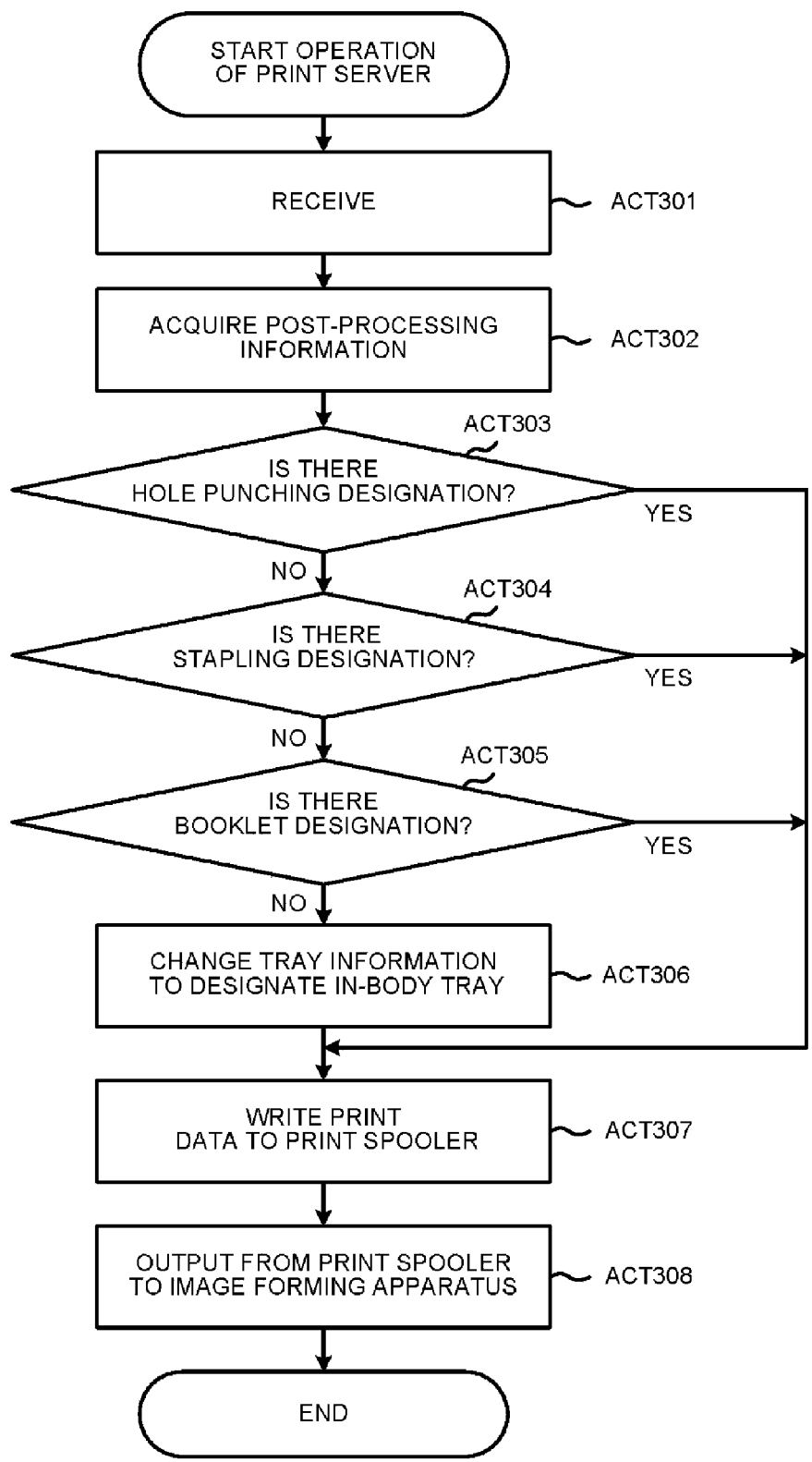
FIG. 7 is a flowchart illustrating an example of the operations carried out by a print server according to embodiment 2.

The operations of the print server 300 are exemplified in the flowchart shown in FIG. 7. The operations are carried out by the processor 310 by executing an operation according to the code instruction of the control program 362. If the processor 310 receives the print data by controlling the network interface 330 (ACT 301), then the post-processing information in the print data is extracted (ACT 302). The operations in ACT 302 and the following ACT 303-ACT 308 are the same as the aforementioned ACT 001-ACT 007 shown in FIG. 3 according to embodiment 1.

The image forming apparatus 200 receives the print data, determines a discharging destination for the printed sheet according to the tray information and discharges the printed paper to the determined discharging destination. This process is also the same as that described in embodiment 1 (refer to FIG. 4).

Like in embodiment 1, the sheet feed source in the tray information is rewritten in embodiment 2.

The feed cassettes 221-223, the feed tray 224, the in-body tray 250 and the finisher trays 261 and 262 which are sheet stacking sections located at an end of the conveyance paths of the image forming apparatus 200 may take the shape of a tray or cassette.

In the present embodiments, the functions for achieving the present invention are prerecorded in the apparatus, however, the present invention is not limited to this, the same functions may also be downloaded to the apparatus from a network or stored in a recording medium and then installed in the apparatus along with the recording medium. The recording medium may be of any form, such as a CD-ROM, that is capable of storing programs and readable to the apparatus. Further, the functions achieved by an installed or downloaded program can also be achieved through the cooperation with an OS (Operating System) in the apparatus.

According to the present embodiments, the user can get a print in a shortened time.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printing system, comprising:
an image forming apparatus comprising a first stacking section which stacks image formed sheets;
a finisher comprising a second stacking section which stacks image formed sheets, the finisher connected to the image forming apparatus; and
a computer comprising;
a memory;
a processor configured to rewrite first information contained in print data stored in the memory and based on a shortest path determination, designate a sheet discharging destination from a setting that is discharged to the second stacking section to a setting that is discharged to the first stacking section,
acquire a designated sheet sized contained in the print data; and
specify one or more sheet feed sources in which the sheets of the designated size are stacked,
if one of the sheet feed source is specified, do not rewrite second information contained in the print data stored in the memory and designate a sheet feed source of the image forming apparatus, if more than one of the sheet feed sources are specified, rewrite the second information to a sheet feed source which is located in an upper part of the specified sheet feed sources of the image forming apparatus; and
an interface configured to send rewritten print data to the image forming apparatus.

2. The printing system according to claim 1, wherein the processor rewrites the first information to shorten the conveyance path of the image forming apparatus.

3. The printing system according to claim 1, wherein the first information is not rewritten by the processor if the print data contains third information designating a processing performed by the finisher.

4. A method for a computer to rewrite print data, including:
rewriting, by system comprising a processor, first information contained in print data stored in a memory;
based on a shortest path determination performed by the system, designating a sheet discharging destination from a setting that is discharged to a second stacking section to a setting that is discharged to a first stacking section,
acquiring, by the system, a designated sheet sized contained in the print data, and
specifying, by the system, one or more sheet feed sources in which the sheets of the designated size are stacked,
if one of a sheet feed source is specified, do not rewrite second information contained in the print data stored in the memory and designate a sheet feed source of the image forming apparatus, if more than one of the sheet feed sources are specified, rewrite the
second information contained in the print data stored in the memory and designate sheet feed sources of an image forming apparatus to a sheet feed source which is located in an upper part of the image forming apparatus; and
sending, by the system, rewritten print data to the image forming apparatus.

5. The print data rewriting method according to claim 4, wherein the first information is rewritten to shorten the conveyance path of the image forming apparatus.

* * * * *